US006480309B1

(12) United States Patent
Lee et al.

(10) Patent No.: US 6,480,309 B1
(45) Date of Patent: Nov. 12, 2002

(54) OPTICAL GATE BASED OPTICAL SPACE DIVISION SWITCH

(75) Inventors: Sang Rok Lee, Taejon (KR); Wan Seok Seo, Taejon (KR); Sung Un Lee, Taejon (KR); Byeong Ho Yoon, Seoul (KR); Joon Hak Bang, Taejon (KR); Jong Hyun Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/379,364

(22) Filed: Aug. 23, 1999

(30) Foreign Application Priority Data

Aug. 22, 1998 (KR) ............................................. 98-34164

(51) Int. Cl.[7] .............................................. H04J 14/00
(52) U.S. Cl. ........................... 359/117; 359/139; 385/16
(58) Field of Search ................................ 359/117, 139; 385/16

(56) References Cited

U.S. PATENT DOCUMENTS

| 4,934,775 A | | 6/1990 | Koai ............................ 385/16 |
| 5,341,234 A | | 8/1994 | Suzuki et al. ................ 359/117 |
| 5,528,710 A | | 6/1996 | Burton et al. ................ 385/16 |
| 5,905,587 A | * | 5/1999 | Maeno et al. ................ 359/117 |
| 6,243,178 B1 | * | 6/2001 | Suemura et al. ............. 359/117 |

OTHER PUBLICATIONS

"Monolithically Integrated 4×4 InGaAsP/InP Laser Amplifier Gate Switch Arrays", Electronic Letters, vol. 28, No. 24, pp. 2223–2225, Nov. 1992.

"Analysis of Input Power Dynamic Ranges in Two Types of Expanded Semiconductor Optical Amplifier Gate Switch Arrays", Technology Letters, vol. 8, No. 4, pp. 536–538, Apr. 1996.

"Impact of Crosstalk Induced Beat Noise on the Size of Semiconductor Laser Amplifier Based Optical Space Switch Structures" Technology Letters, vol. 8, No. 7, pp. 894–896, Jul. 1996.

* cited by examiner

Primary Examiner—Daniel J. Wu
(74) Attorney, Agent, or Firm—Antonelli, Terry, Stout & Kraus, LLP

(57) ABSTRACT

An optical gate based optical space division switch for switching optical signals inputted through arbitrary input ports to a desired output port with no internal collision. The optical space division switch comprises a first splitting section for splitting the optical signals inputted through the input ports, a first amplification section for selectively amplifying output optical signals from the first splitting section, a second splitting section for splitting output optical signals from the first amplification section, a second amplification section for selectively amplifying output optical signals from the second splitting section, a coupling section for coupling output optical signals from the second amplification section, and a third amplification section for amplifying an output optical signal from the coupling section and transferring the amplified optical signal to the output port. According to the present invention, optical gates are connected in a two-stage manner to cross-couple optical signals. Therefore, the optical signals are transferred only to a desired output port, thereby reducing the number of their crosstalk components and so significantly improving a signal-to-noise ratio.

14 Claims, 4 Drawing Sheets

OPTICAL GATE BASED OPTICAL SPACE DIVISION SWITCH

BACKGROUND OF THE INVENTION

1. Field of the Invention

The present invention relates in general to optical gate based optical space division switches, and more particularly to an optical space division switch in which optical gates are connected in a two-stage manner to cross-couple optical signals, so that optical signals inputted through arbitrary input ports can be switched to a desired output port with no internal collision.

2. Description of the Prior Art

Generally, optical gate based optical space division switches function to switch optical signals inputted through arbitrary input ports to a desired output port in response to optical gates being turned on or off.

A 4×4 optical gate based optical space division switch has been proposed by Gustavsson et al., and it is shown in FIG. 1 herein (see: "Monolithically integrated 4×4 InGaAs/InP laser amplifier gate switch arrays", Electronic Letters, vol.28, no.24, pp.2223–2225, Nov. 1992).

As shown in FIG. 1, the 4×4 optical gate based optical space division switch comprises an optical gate 110 with four optical amplifiers 111 based on semiconductor devices, and 1×4 optical splitters 121–124 having their input terminals connected respectively to output terminals of the optical gate 110. Optical gates 131–134 each includes four optical amplifiers 111 based on semiconductor devices and has its input terminals connected respectively to output terminals of a corresponding one of the 1×4 optical splitters 121–124. The conventional optical space division switch further comprises 4×1 optical couplers 141–144 each having its input terminals connected respectively to corresponding ones of output terminals of the optical gates 131–134. An optical gate 150 includes four optical amplifiers 111 based on semiconductor devices, and has its input terminals connected respectively to output terminals of the 4×1 optical couplers 141–144.

Noticeably, the input optical gate 110 and the output optical gate 150 are always maintained at their ON state. For this reason, the input and output optical gates 110 and 150 are not operated as optical gates for selectively transferring optical signals, but only as optical amplifiers for compensating for signal loss by optical components.

The operation of the conventional 4×4 optical gate based optical space division switch with the above-mentioned construction will hereinafter be described.

First, the four optical amplifiers in the input optical gate 110 amplify optical signals inputted through input ports IP1–IP4 and transfer the amplified optical signals to the 1×4 optical splitters 121–124, respectively.

Each of the 1×4 optical splitters 121–124 splits a corresponding one of the output optical signals from the optical gate 110 into four optical signals and transfers the split optical signals to a corresponding one of the optical gates 131–134.

The four optical amplifiers in each of the optical gates 131–134 amplify the output optical signals from a corresponding one of the 1×4 optical splitters 121–124 and transfer the amplified optical signals to the 4×1 optical couplers 141–144, respectively. At this time, the optical gates 131–134 are turned on or off to selectively transfer the output optical signals from the 1×4 optical splitters 121–124 to the 4×1 optical couplers 141–144.

Each of the 4×1 optical couplers 141–144 couples the four output optical signals from the optical gates 131–134 into one optical signal, which is then transferred to the output optical gate 150.

The four optical amplifiers in the output optical gate 150 amplify the output optical signals from the 4×1 optical couplers 141–144 and transfer the amplified optical signals externally through output ports OP1–OP4, respectively.

However, the above-mentioned conventional optical sspace divisionswitch has a disadvantage in that, even if the optical gates 131–134 are turned off, they often transfer partially the optical signals due to their imperfect ON/OFF characteristic. Such crosstalk components degrade the performance of other signals.

SUMMARY OF THE INVENTION

Therefore, the present invention has been made in view of the above problem, and it is an object of the present invention to provide an optical gate based optical space division switch which is capable of switching optical signals inputted through arbitrary input ports to a desired output port with no internal collision. The transfer of the input optical signals is blocked by double gating so that they can hardly be transferred to undesired output ports. Hence, the input optical signals can be transferred only to a desired output port, resulting in a significant reduction in the number of their crosstalk components.

In accordance with one aspect of the present invention, there is provided an optical gate based optical space division switch for switching optical signals inputted through arbitrary input ports to a desired output port with no internal collision, comprising first splitting means for splitting the optical signals inputted through the input ports; first amplification means for selectively amplifying output optical signals from the first splitting means; second splitting means for splitting output optical signals from the first amplification means; second amplification means for selectively amplifying output optical signals from the second splitting means; coupling means for coupling output optical signals from the second amplification means; and third amplification means for amplifying an output optical signal from the coupling means and transferring the amplified optical signal to the output port.

In accordance with another aspect of the present invention, there is provided an optical gate based optical space division switch for switching optical signals inputted through arbitrary input ports to a desired output port with no internal collision, comprising first amplification means for amplifying the optical signals inputted through the input ports; signal splitting means for splitting output optical signals from the first amplification means; second amplification means for selectively amplifying output optical signals from the signal splitting means; first coupling means for coupling output optical signals from the second amplification means; third amplification means for selectively amplifying output optical signals from the first coupling means; and second coupling means for coupling output optical signals from the third amplification means and transferring the coupled result to the output port.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 2:
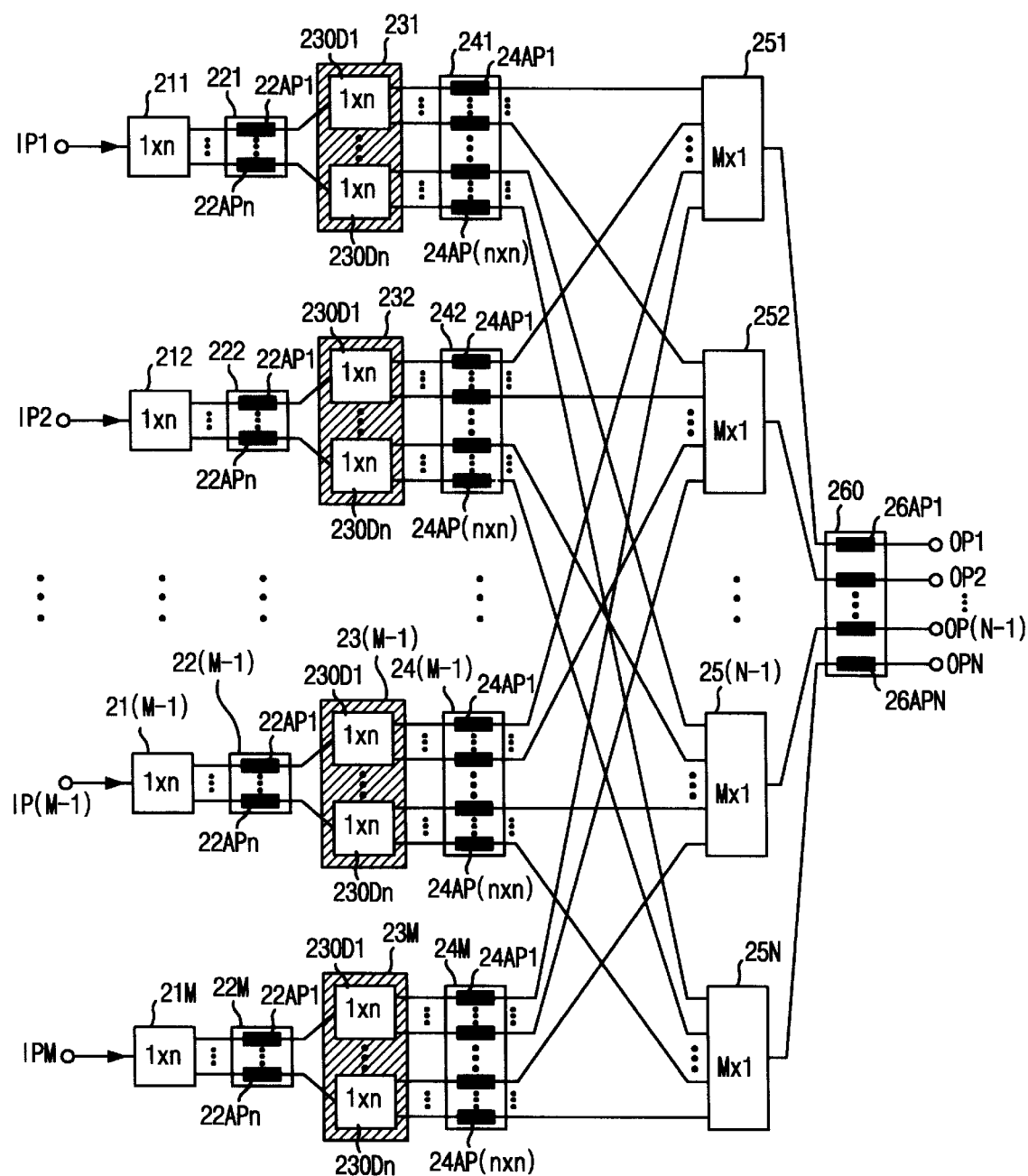
FIG. 2 is a block diagram of an optical gate based optical space division switch in accordance with an embodiment of the present invention.

With reference to FIG. 2, there is shown in block form an M×N optical gate based optical space division switch in accordance with an embodiment of the present invention. As shown in this drawing, the M×N optical gate based optical space division switch comprises 1×n optical splitters 211–21M having their input terminals connected respectively to M input ports IP1–IPM. Optical gates 221–22M each includes n (where, $n=N^{1/2}$) optical amplifiers 22AP1–22APn having their input terminals connected respectively to output terminals of a corresponding one of the 1×n optical splitters 211–21M. Optical splitter blocks 231–23M each includes n 1×n optical splitters 230D1–230Dn having their input terminals connected respectively to output terminals of a corresponding one of the optical gates 221–22M. Optical gates 241–24M each includes n×n optical amplifiers 24AP1–24AP(n×n) each having its input terminal connected to a corresponding one of output terminals of the 1×n optical splitters 230D1–230Dn in a corresponding one of the optical splitter blocks 231–23M. The optical space division switch further comprises M×1 optical couplers 251–25N each having its input terminals connected respectively to corresponding ones of output terminals of the optical gates 241–24M. An optical gate 260 includes N optical amplifiers 26AP1–26APN having their input terminals connected respectively to output terminals of the M×1 optical couplers 251–25N and their output terminals connected respectively to N output ports OP1–OPN.

Noticeably, the optical amplifiers 26AP1–26APN in the optical gate 260 are always maintained at their ON state to compensate for a loss in output optical signals.

The operation of the M×N optical gate based optical space division switch with the above-mentioned construction in accordance with the embodiment of the present invention will hereinafter be described in detail.

First, each of the 1×n optical splitters 211–21M splits one optical signal incident upon a corresponding one of the input ports IP1–IPM into n optical signals and transfers the split n optical signals respectively to the n optical amplifiers 22AP1–22APn in a corresponding one of the optical gates 221–22M.

In each of the optical gates 221–22M, one of the n optical amplifiers 22AP1–22APn, connected toward a selected output port, is turned on and the others are turned off. The turned-on optical amplifier amplifies a corresponding one of the optical signals transferred by the associated 1×n optical splitter and transfers the amplified optical signal to a corresponding one of the optical splitter blocks 231–23M.

The output optical signal from the turned-on amplifier in each of the optical gates 221–22M is split into n optical signals by the associated 1×n optical splitter in a corresponding one of the optical splitter blocks 231–23M and transferred to a corresponding one of the optical gates 241–24M.

In each of the optical gates 241–24M, one of the n×n optical amplifiers 24AP1–24AP(n×n), connected toward the selected output port, is turned on and the others are turned off. The turned-on optical amplifier amplifies a corresponding one of the optical signals transferred by the associated 1×n optical splitter in a corresponding one of the optical splitter blocks 231–23M and transfers the amplified optical signal to a corresponding one of the M×1 optical couplers 251–25N, connected toward the selected output port.

Then, the M×1 optical coupler connected toward the selected output port couples the M optical signals from the turned-on optical amplifiers in the optical gates 241–24M into one optical signal and transfers the coupled optical signal to a corresponding one of the optical amplifiers 26AP1–26APN in the optical gate 260, connected to the selected output port.

The optical amplifiers 26AP1–26APN in the optical gate 260 are always maintained at their ON state. As a result, the optical amplifier connected to the selected output port amplifies the output optical signal from the M×1 optical coupler and transfers the amplified optical signal to the selected output port.

In this manner, the optical signals incident upon the input ports are passed sequentially through the first optical gates 221–22M and the second optical gates 241–24M and then transferred to the selected output port. But, the incident optical signals are hardly transferred to non-selected output ports by the first optical gates 221–22M and the second optical gates 241–24M. Therefore, the number of crosstalk components of the input optical signals is reduced by $M^{1/2}-1$, resulting in an improvement in signal-to-noise ratio.

Figure 3:
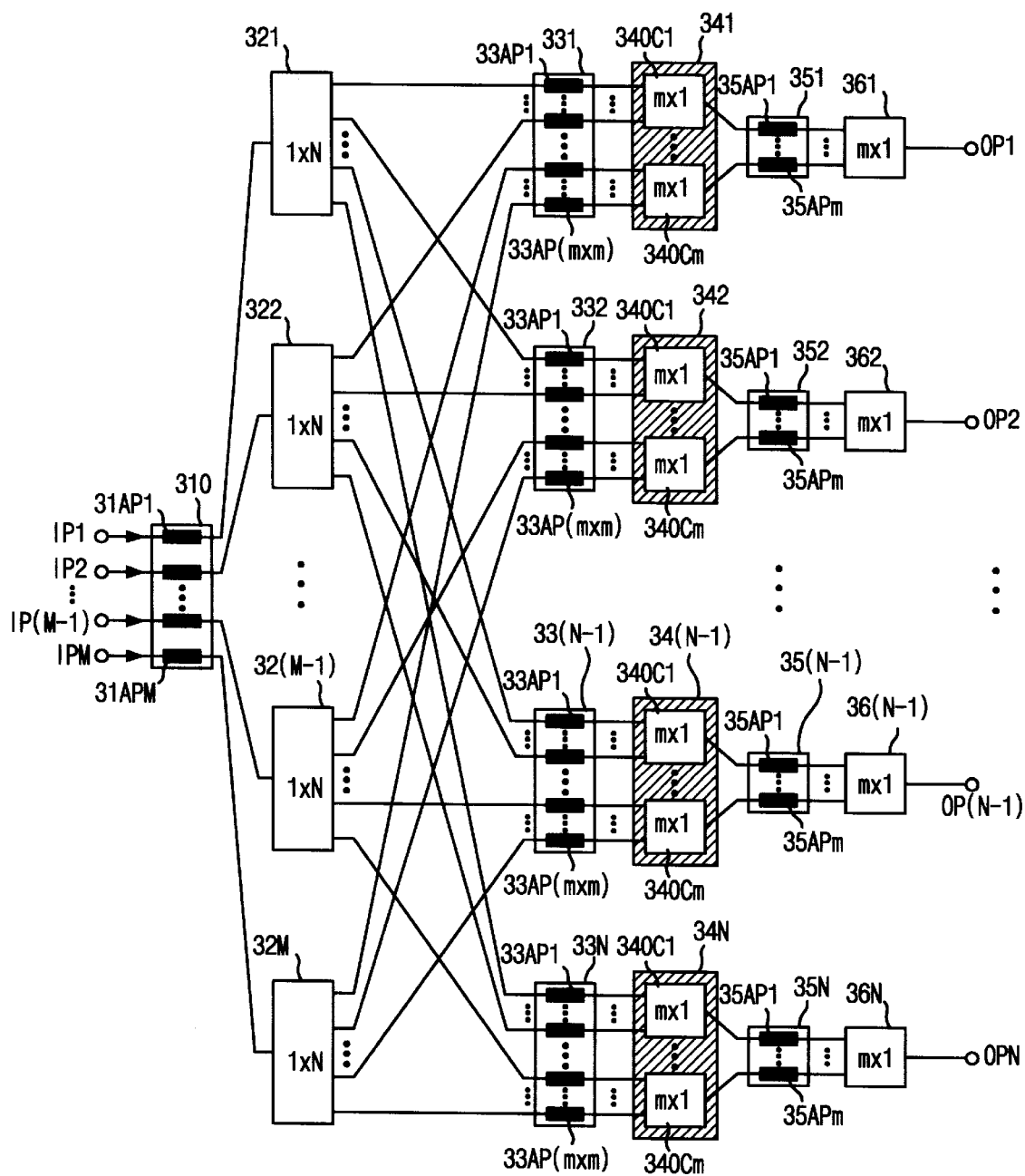
FIG. 3 is a block diagram of an optical gate based optical space division switch in accordance with an alternative embodiment of the present invention.

With reference to FIG. 3, there is shown in block form an M×N optical gate based optical space division switch in accordance with an alternative embodiment of the present invention. As shown in this drawing, the M×N optical gate based optical space division switch comprises an optical gate 310 which includes M optical amplifiers 31AP1–31APM having their input terminals connected respectively to M input ports IP1–IPM. The optical space division switch further comprises 1×N optical splitters 321–32M having their input terminals connected respectively to output terminals of the optical amplifiers 31AP1–31APM in the optical gate 310. Optical gates 331–33N each includes m×m optical amplifiers 33AP1–33AP(m×m) having their input terminals connected respectively to corresponding ones of output terminals of the 1×N optical splitters 321–32M. Optical coupler blocks 341–34N each includes m (where, $M=M^{1/2}$) m×1 optical couplers 340C1–340Cm having their input terminals connected respectively to output terminals of a corresponding one of the optical gates 331–33N. Optical gates 351–35N each includes m optical amplifiers 35AP1–35APm having their input terminals connected respectively to output terminals of the m×1 optical couplers 340C1–340Cm in a corresponding one of the optical coupler blocks 341–34N. The optical space division switch further comprises m×1 optical couplers 361–36N each having its input terminals connected respectively to output terminals of the optical amplifiers 35AP1–35APm in a corresponding one of the optical gates 351–35N and its output terminal connected to a corresponding one of N output ports OP1–OPN.

Noticeably, the optical amplifiers 31AP1–31APM in the optical gate 310 are always maintained at their ON state to compensate for a loss in input optical signals.

The operation of the M×N optical gate based optical space division switch with the above-mentioned construction in accordance with the second embodiment of the present invention will hereinafter be described in detail.

First, the optical amplifiers 31AP1–31APM in the optical gate 310 amplify optical signals incident upon the input ports IP1–IPM and transfer the amplified optical signals to the 1×N optical splitters 321–32M, respectively.

Each of the 1×N optical splitters 321–32M splits the output optical signal from a corresponding one of the optical amplifiers 31AP1–31APM in the optical gate 310 into N optical signals and transfers the split N optical signals respectively to corresponding ones of the m×m optical amplifiers 33AP1–33AP(m×m) in the optical gates 331–33N.

One of the optical gates 331–33N, connected toward a selected output port, is turned on and the others are turned off. As a result, the m×m optical amplifiers 33AP1–33AP (m×m) in the turned-on optical gate amplify the optical signals transferred by the 1×N optical splitters 321–32M and transfer the amplified optical signals to a corresponding one of the optical coupler blocks 341–34N, respectively.

The m optical signals transferred by the optical amplifiers in the turned-on optical gate are coupled into one optical signal by the associated m×1 optical coupler in a corresponding one of the optical coupler blocks 341–34N and then transferred to a corresponding one of the optical gates 351–35N.

One of the optical gates 351–35N, connected toward the selected output port, is turned on and the others are turned off. As a result, the optical amplifiers 35AP1–35APm in the turned-on optical gate amplify the optical signals transferred by the m×1 optical couplers 340C1–340Cm in the associated optical coupler block and transfer the amplified optical signals to a corresponding one of the m×1 optical couplers 361–36N, connected to the selected output port, respectively.

Then, the m×1 optical coupler connected to the selected output port couples the m optical signals from the optical amplifiers 35AP1–35APm in the turned-on optical gate into one optical signal and transfers the coupled optical signal to the selected output port.

As stated previously, the optical signals incident upon the input ports are passed sequentially through the first optical gates 331–33N and the second optical gates 351–35N and then transferred to the selected output port. But, the incident optical signals are hardly transferred to nonselected output ports by the first optical gates 331–33N and the second optical gates 351–35N. Therefore, the number of crosstalk components of the input optical signals is reduced by $M^{1/2}-1$, resulting in an improvement in signal-to-noise ratio.

Figure 1:
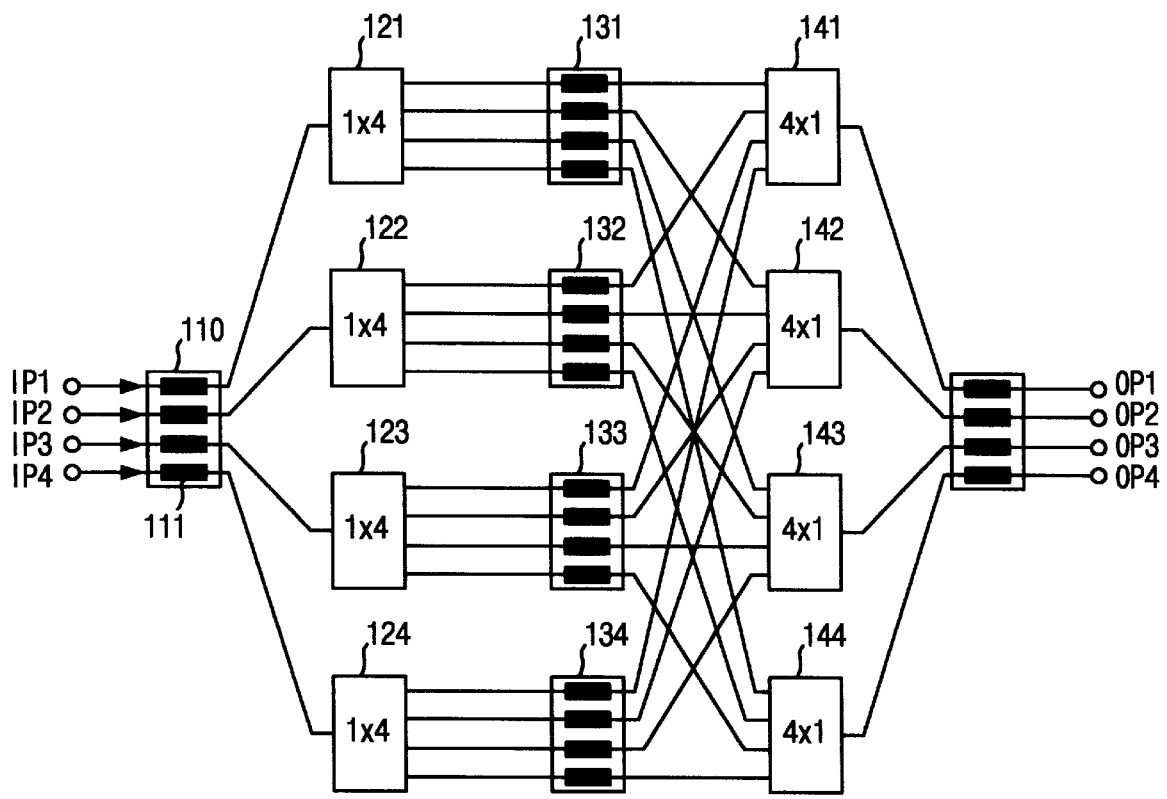
FIG. 1 is a block diagram of a conventional 4×4 optical gate based optical space division switch.
Figure 4:
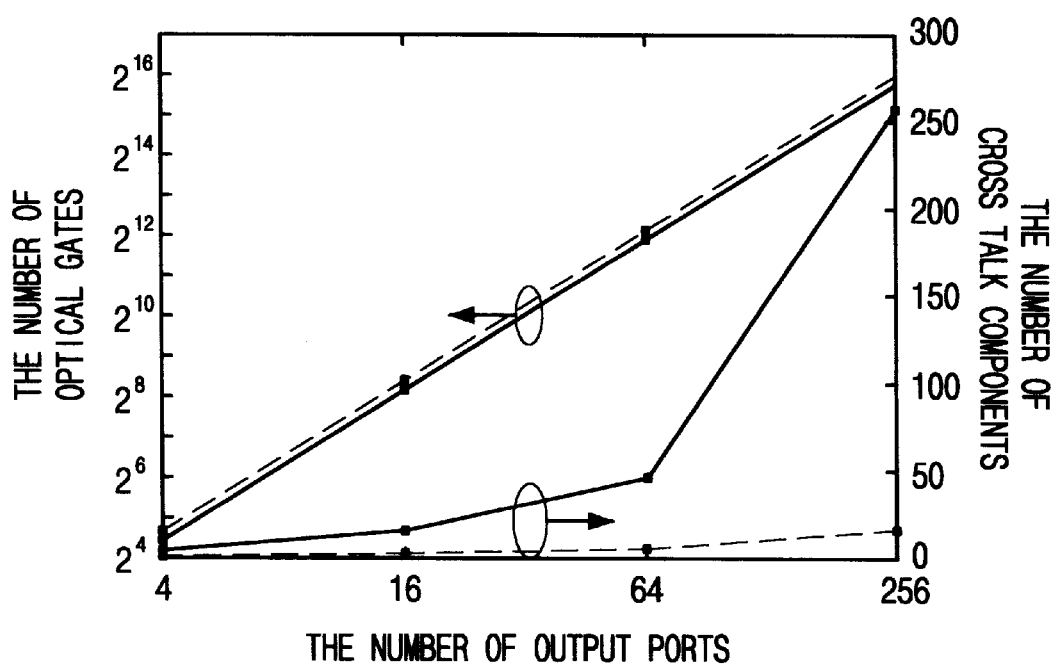
FIG. 4 is a view showing the comparison between characteristics of the conventional optical space division switch in FIG. 1 and optical space division switch of the present invention in FIG. 2.

FIG. 4 shows the comparison between characteristics of the conventional optical space division switch in FIG. 1 and optical space division switch of the present invention in FIG. 2. In this drawing, the comparison is made especially with respect to the number of optical gates required in construction and the number of crosstalk components.

In FIG. 4, the characteristic of the conventional optical space division switch in FIG. 1 is indicated by solid lines and the characteristic of the present optical space division switch in FIG. 2 is indicated by dotted lines.

It can be seen from FIG. 4 that, for an M×N optical space division switch fabric, the present optical space division switch in FIG. 2 requires a number of optical gates about 17% more than that in the conventional optical space division switch in FIG. 1. However, the number of crosstalk components in the present optical space division switch in FIG. 2 is significantly reduced as compared with that in the conventional optical space division switch in FIG. 1.

As apparent from the above description, according to the present invention, optical gates are connected in a two-stage manner to cross-couple optical signals, so that the optical signals can hardly be transferred to undesired output ports. Therefore, the optical signals are transferred only to a desired output port, thereby reducing the number of their crosstalk components and so significantly improving a signal-to-noise ratio.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical gate based optical space division switch for switching optical signals inputted through arbitrary input ports to a desired output port with no internal collision, comprising:

first splitting means for splitting said optical signals inputted through said input ports;

first amplification means for selectively amplifying output optical signals from said first splitting means;

second splitting means for splitting output optical signals from said first amplification means;

second amplification means for selectively amplifying output optical signals from said second splitting means;

coupling means for coupling output optical signals from said second amplification means; and third amplification means for amplifying an output optical signal from said coupling means and transferring the amplified optical signal to said output port.

2. An optical gate based optical space division switch as set forth in claim 1, wherein said first splitting means includes a plurality of 1×n optical splitters each for splitting a corresponding one of said input optical signals into n (where, n is a natural number) optical signals.

3. An optical gate based optical space division switch as set forth in claim 1, wherein said first amplification means includes a plurality of optical gates, each of said optical gates including a plurality of optical amplifiers turned on/off to selectively amplify said output optical signals from said first splitting means.

4. An optical gate based optical space division switch as set forth in claim 1, wherein said second splitting means includes a plurality of optical splitter blocks, each of said optical splitter blocks including a plurality of 1×n optical splitters each for splitting a corresponding one of said output optical signals from said first amplification means into n (where, n is a natural number) optical signals.

5. An optical gate based optical space division switch as set forth in claim 1, wherein said second amplification means includes a plurality of optical gates, each of said optical gates including a plurality of optical amplifiers turned on/off to selectively amplify said output optical signals from said second splitting means.

6. An optical gate based optical space division switch as set forth in claim 1, wherein said coupling means includes a plurality of M×1 optical couplers each for coupling M (where, M is a natural number) output optical signals from said second amplification means into one optical signal.

7. An optical gate based optical space division switch as set forth in claim 1, wherein said third amplification means includes an optical gate having a plurality of optical amplifiers, each of said optical amplifiers being always turned on to amplify said output optical signal from said coupling means.

8. An optical gate based optical space division switch for switching optical signals inputted through arbitrary input ports to a desired output port with no internal collision, comprising:

first amplification means for amplifying said optical signals inputted through said input ports;

signal splitting means for splitting output optical signals from said first amplification means;

second amplification means for selectively amplifying output optical signals from said signal splitting means;

first coupling means for coupling output optical signals from said second amplification means;

third amplification means for selectively amplifying output optical signals from said first coupling means; and second coupling means for coupling output optical signals from said third amplification means and transferring the coupled result to said output port.

9. An optical gate based optical space division switch as set forth in claim 8, wherein said first amplification means includes an optical gate having a plurality of optical amplifiers, said optical amplifiers being always turned on to amplify said input optical signals, respectively.

10. An optical gate based optical space division switch as set forth in claim 8, wherein said signal splitting means includes a plurality of 1×N optical splitters each for splitting a corresponding one of said output optical signals from said first amplification means into N (where, N is a natural number) optical signals.

11. An optical gate based optical space division switch as set forth in claim 8, wherein said second amplification means includes a plurality of optical gates, each of said optical gates including a plurality of optical amplifiers turned on/off to selectively amplify said output optical signals from said splitting means.

12. An optical gate based optical space division switch as set forth in claim 8, wherein said first coupling means includes a plurality of optical coupler blocks, each of said optical coupler blocks including a plurality of m×1 optical couplers each for coupling m (where, m is a natural number) output optical signals from said second amplification means into one optical signal.

13. An optical gate based optical space division switch as set forth in claim 8, wherein said third amplification means includes a plurality of optical gates, each of said optical gates including a plurality of optical amplifiers turned on/off to selectively amplify said output optical signals from said first coupling means.

14. An optical gate based optical space division switch as set forth in claim 8, wherein said second coupling means includes a plurality of m×1 optical couplers each for coupling m (where, m is a natural number) output optical signals from said third amplification means into one optical signal.

* * * * *